United States Patent
Aurongzeb et al.

(10) Patent No.: US 11,662,785 B2
(45) Date of Patent: May 30, 2023

(54) MANAGING THERMAL DISSIPATION IN A DISPLAY OF AN INFORMATION HANDLING SYSTEM

(71) Applicant: Dell Products L.P., Round Rock, TX (US)

(72) Inventors: Deeder Aurongzeb, Austin, TX (US); Andrew T. Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/376,976

(22) Filed: Jul. 15, 2021

(65) Prior Publication Data

US 2023/0015319 A1 Jan. 19, 2023

(51) Int. Cl.
G06F 1/20 (2006.01)
G09G 3/3208 (2016.01)
G09G 3/34 (2006.01)

(52) U.S. Cl.
CPC ........... *G06F 1/206* (2013.01); *G09G 3/3208* (2013.01); *G09G 3/3406* (2013.01); *G09G 2320/043* (2013.01); *G09G 2330/045* (2013.01)

(58) Field of Classification Search
None
See application file for complete search history.

(56) References Cited

U.S. PATENT DOCUMENTS

| | | | | |
|---|---|---|---|---|
| 2011/0241980 A1* | 10/2011 | Lee | ......... | G02B 6/008 345/102 |
| 2014/0232708 A1* | 8/2014 | Kitazawa | ......... | G09G 5/10 345/207 |
| 2016/0187559 A1* | 6/2016 | Li | ......... | G02B 6/002 362/609 |
| 2018/0144693 A1* | 5/2018 | Saito | ......... | H04N 21/4333 |
| 2018/0247725 A1* | 8/2018 | Zurutuza Elorza | ... | C01B 32/194 |
| 2018/0330674 A1* | 11/2018 | Baar | ......... | H05B 45/20 |
| 2021/0231998 A1* | 7/2021 | Noso | ......... | G02F 1/133385 |

OTHER PUBLICATIONS

Fan, Yansong, et al. "Monolayer-graphene-based broadband and wide-angle perfect absorption structures in the near infrared." *Scientific reports* 8.1 (2018): 1-8.

* cited by examiner

*Primary Examiner* — Andre L Matthews
(74) *Attorney, Agent, or Firm* — McDermott Will & Emery LLP

(57) ABSTRACT

In one embodiment, a method for managing thermal dissipation in a display of an information handling system includes: emitting, by a light source of the display, a visible light within the display, the visible light associated with a heat within the display; receiving, by an absorption layer of the display, the visible light within the display, the absorption layer coupled to a display cover of the display; absorbing, by the absorption layer, a portion of the visible light comprising a light leakage from the display; absorbing, by the absorption layer, a portion of the heat within the display; and transferring, by the absorption layer, the portion of the heat into the display cover.

18 Claims, 4 Drawing Sheets

400

```
┌─────────────────────────────────────────────────┐
│  EMIT, BY A LIGHT SOURCE OF A DISPLAY, A VISIBLE LIGHT │
│              WITHIN THE DISPLAY.                │
│                      410                        │
└─────────────────────────────────────────────────┘
                        ↓
┌─────────────────────────────────────────────────┐
│ RECEIVE, BY AN ABSORPTION LAYER OF THE DISPLAY, THE VISIBLE │
│            LIGHT WITHIN THE DISPLAY.            │
│                      420                        │
└─────────────────────────────────────────────────┘
                        ↓
┌─────────────────────────────────────────────────┐
│ ABSORB, BY THE ABSORPTION LAYER, A PORTION OF THE VISIBLE LIGHT │
│     COMPRISING A LIGHT LEAKAGE FROM THE DISPLAY.│
│                      430                        │
└─────────────────────────────────────────────────┘
                        ↓
┌─────────────────────────────────────────────────┐
│ ABSORB, BY THE ABSORPTION LAYER, A PORTION OF HEAT WITHIN THE │
│                    DISPLAY.                     │
│                      440                        │
└─────────────────────────────────────────────────┘
                        ↓
┌─────────────────────────────────────────────────┐
│ TRANSFER, BY THE ABSORPTION LAYER, THE PORTION OF HEAT INTO A │
│          DISPLAY COVER OF THE DISPLAY.          │
│                      450                        │
└─────────────────────────────────────────────────┘
```

FIG. 4

MANAGING THERMAL DISSIPATION IN A DISPLAY OF AN INFORMATION HANDLING SYSTEM

BACKGROUND

Field of the Disclosure

The disclosure relates generally to information handling systems, and in particular to managing thermal dissipation in a display of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for managing thermal dissipation in a display of an information handling system includes: emitting, by a light source of the display, a visible light within the display, the visible light associated with a heat within the display; receiving, by an absorption layer of the display, the visible light within the display, the absorption layer coupled to a display cover of the display; absorbing, by the absorption layer, a portion of the visible light comprising a light leakage from the display; absorbing, by the absorption layer, a portion of the heat within the display; and transferring, by the absorption layer, the portion of the heat into the display cover.

In one or more of the disclosed embodiments, the method further includes: transferring, by the display cover, the portion of the heat away from the information handling system.

In one or more of the disclosed embodiments, the method further includes: receiving, by a reflective layer of the display, the visible light within the display, the reflective layer coupled to the absorption layer; and reflecting, by the reflective layer, the visible light within the display.

In one or more of the disclosed embodiments, the reflective layer is a composite comprised of an acrylic polymer and a granulated silver.

In one or more of the disclosed embodiments, the method further includes: identifying, by a thermal controller of the information handling system, that an operating mode of the display has been modified from a normal mode to an enhanced mode, the enhanced mode causing the light source to emit the visible light with an increased brightness; identifying, by the thermal controller, a transition period associated with the enhanced mode, the transition period comprising a period of time in which the operating mode changes from the normal mode to the enhanced mode; determining, by the thermal controller, a modified transition period associated with the enhanced mode based on the transition period and a temperature associated with the increased brightness; and causing, by the thermal controller, the operating mode to change from the normal mode to the enhanced mode based on the modified transition period.

In one or more of the disclosed embodiments, the modified transition period comprises a longer period of time than the transition period, the longer period of time allowing the operating mode of the display to change from the normal mode to the enhanced mode without the temperature associated with the increased brightness causing a delamination of the display.

In one or more of the disclosed embodiments, the enhanced mode includes: a high dynamic range (HDR) mode; and a high refresh rate (HRR) mode.

In one or more of the disclosed embodiments, the absorption layer is a composite comprised of an acrylic polymer and a granulated graphene.

In one or more of the disclosed embodiments, the light source of the display is comprised of a plurality of organic light-emitting diodes (OLEDs).

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 4 is a flowchart depicting selected elements of an embodiment of a method for managing thermal dissipation in a display of an information handling system.

DESCRIPTION OF PARTICULAR EMBODIMENT(S)

Figure 1:
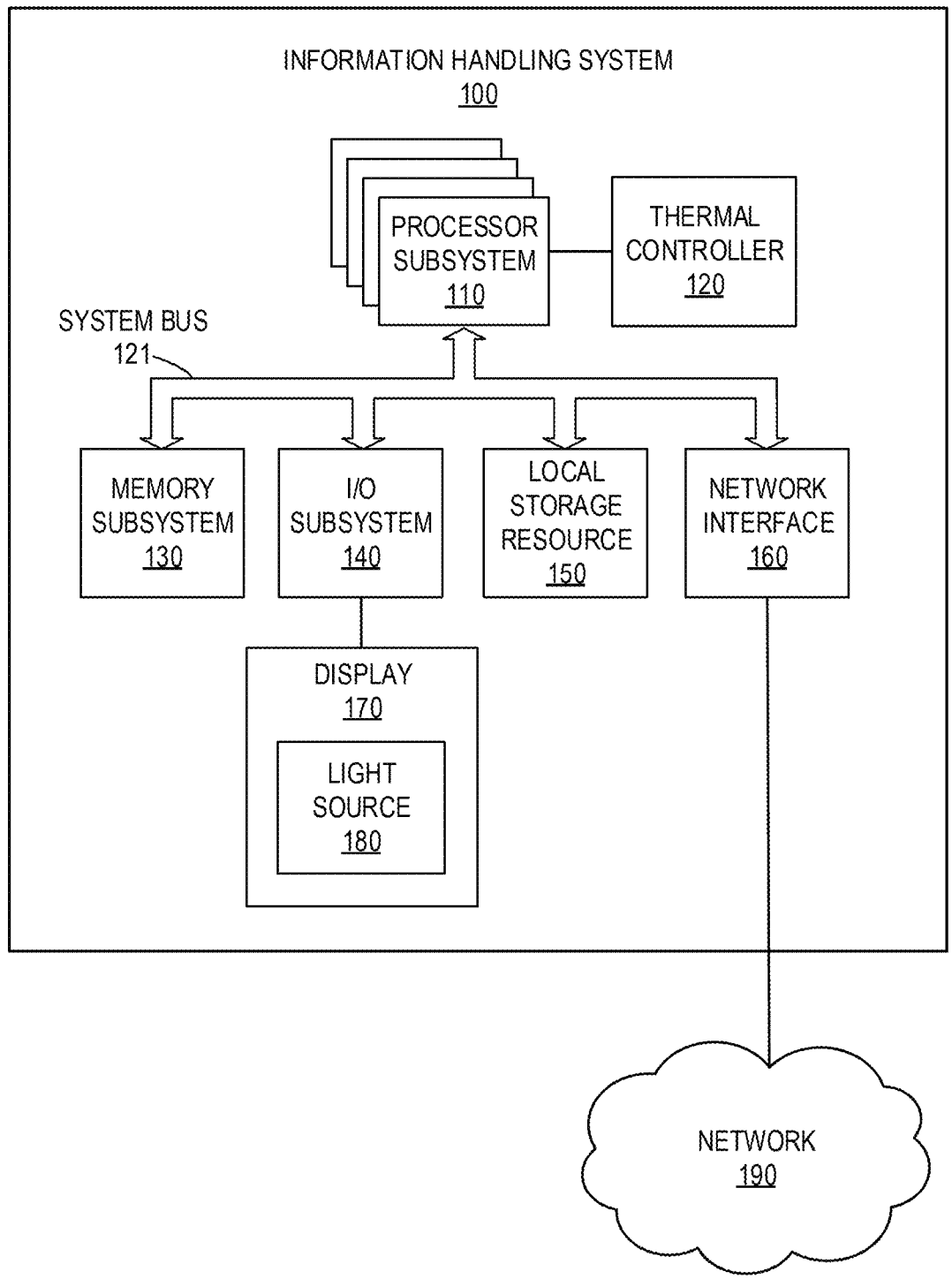
FIG. 1 is a block diagram of selected elements of an embodiment of an information handling system.

This document describes a method for managing thermal dissipation in a display of an information handling system that includes: emitting, by a light source of the display, a visible light within the display, the visible light associated with a heat within the display; receiving, by an absorption layer of the display, the visible light within the display, the absorption layer coupled to a display cover of the display; absorbing, by the absorption layer, a portion of the visible light comprising a light leakage from the display; absorbing, by the absorption layer, a portion of the heat within the display; and transferring, by the absorption layer, the portion of the heat into the display cover.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 110, which may comprise one or more processors, and system bus 121 that communicatively couples various system components to processor subsystem 110 including, for example, a memory subsystem 130, an I/O subsystem 140, a local storage resource 150, and a network interface 160. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus. As shown in FIG. 1, information handling system 100 may additionally include a thermal controller 120 and a display 170 that includes a light source 180. In other embodiments, computing environment 195 may include additional, fewer, and/or different components than the components shown in FIG. 1.

In information handling system 100, processor subsystem 110 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 110 may interpret and/or execute program instructions and/or process data stored locally (e.g., in memory subsystem 130 and/or another component of information handling system 100). In the same or alternative embodiments, processor subsystem 110 may interpret and/or execute program instructions and/or process data stored remotely. In one embodiment, processor subsystem 110 may be or include a multi-core processor comprised of one or more processing cores disposed upon an integrated circuit (IC) chip. In other embodiments, processor subsystem 110 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 140 may comprise a system, device, or apparatus generally operable to receive and/or transmit data to, from, and/or within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device. In the embodiment illustrated in FIG. 1, I/O subsystem 140 may be communicably coupled to display 170.

In one embodiment, local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 160 may be a suitable system, apparatus, or device operable to serve as an interface between information handling system 100 and a network 160. Network interface 160 may enable information handling system 100 to communicate over network 160 using a suitable transmission protocol and/or standard, including, but not limited to, transmission protocols and/or standards enumerated below with respect to the discussion of network 160. Network 160 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 160 may include one or more routers for routing data between client information handling systems 100 and server information handling systems 100. A device (e.g., a client information handling system 100 or a server information handling system 100) on network 160 may be addressed by a corresponding network address including, for example, an Internet protocol (IP) address, an Internet name, a Windows Internet name service (WINS) name, a domain name or other system name. In particular embodiments, network 160 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 160 and its various components may be implemented using hardware, software, or any combination thereof.

In one embodiment, display 170 may be a suitable system, apparatus, or device operable to display information processed by information handling system 100. In particular, display 170 may be or include an output device comprised of a light source 180 configured to emit visible light to display information to a user, a casing to house the light source 180, and a power supply. In one embodiment, display 170 be or include an organic light-emitting diode (OLED) display with an OLED light source 180. In other embodiments, display 170 may be or include a light-emitting diode (LED) monitor, a plasma display panel monitor, and/or any other type of monitor suitable for displaying information processed by information handling system 100.

In one embodiment, light source 180 may be a suitable system, apparatus, or device operable to illuminate display 170. In particular, light source 180 may be or include a semiconductor light source used to supply backlighting to illuminate components of display 170. For example, light source 180 may emit a visible light evenly throughout display 170 such that information may be uniformly displayed to a user. In another example, light source 180 may emit a visible light through one or more optical sheets (not shown in figure) of display 170. In the embodiment illustrated in FIG. 1, light source 180 may be or include one or more OLEDs. In other embodiments, light source 180 may provide backlighting for a back-lit display and/or may be oriented in any manner suitable for illuminating display 170.

In one embodiment, display 170 may display information to a user in accordance with one or more display modes, or "operating modes." Each operating mode of display 170 may cause light source 180 to emit visible light at a respective brightness, thereby causing light source 180 to generate respective levels of heat within display 170. In one embodiment, a user (e.g., user 200 shown in FIGS. 2 and 3) may cause display 170 to change operating modes by selecting a desired operating mode from a list of available operating modes. For example, a list of available operating modes of display 170 may be electronically presented to a user via a settings menu within display 170.

Examples of operating modes of display 170 may include, but are not limited to, a normal mode having an operating temperature of approximately 30° C., a high dynamic range (HDR) mode having an operating temperature of approximately 40° C., a high refresh rate (HRR) operating mode having an operating temperature of approximately 40° C., and the like. In these examples, HDR and HRR modes may comprise higher quality operating modes, or "enhanced modes," over the normal mode, thereby requiring an increased brightness of light source 180 which, in turn, may generate higher temperatures. In addition, display 170 may exhibit an abnormal mode indicating potential thermal issues (i.e., hot spots) around an edge of display 170. Here, the abnormal mode may occur as an inadvertent result of use and/or wear of display 170 and may have an operating temperature of greater than 50° C. In one embodiment, each operating mode may be associated with a period of time, or a "transition period," in which the operating mode changes from a first operating mode to a second operating mode. For example, a change from a normal mode of display 170 to an HDR mode may have a transition period of less than one second.

In one embodiment, thermal controller 120 may be a suitable system, apparatus, or device operable to manage thermal dissipation in information handling system 100. Specifically, thermal controller 120 may be or include a hardware device operable to manage operating modes of display 170 such that transition periods between operating modes may be modified to avoid damage to display 170 due to temperatures associated with increased brightness of light source 180. Conventional displays may transition between operating modes such that a transition period between a normal mode and an enhanced mode (e.g., HDR mode, HRR mode, and the like) may cause a sudden increase in brightness of a light source. Such a sudden increase in brightness may cause a rapid increase in temperature associated with the increased brightness, which may inadvertently cause damage to the display over time. For example, rapid increases in temperature associated with a transition from a normal mode to an enhanced mode occurring in a transition period of less than one second may cause a deformation in the display in which a screen, or other such exterior surface of the display, may become delaminated from the display over time.

In contrast, thermal controller 120 may manage thermal dissipation within display 170 to avoid inadvertent damage to display 170 cause by changes in operating modes. In particular, thermal controller 120 may identify that an operating mode of display 170 has been modified from a normal mode to an enhanced mode. Here, the enhanced mode may cause light source 180 to emit visible light with an increased brightness than that of the normal mode, thereby generating higher temperatures within display 170. In one embodiment, upon identifying that the operating mode of display 170 has been modified to an enhanced mode, thermal controller 120 may identify a transition period associated with the enhanced mode. For example, thermal controller 120 may access information describing one or more transition periods associated with various operating modes stored in memory subsystem 130 such that thermal controller 120 may identify the transition period associated with an HDR mode accordingly. In one embodiment, thermal controller 120 may determine an alternate transition period, or a "modified transition period," based on the identified transition period and a temperature associated with the increased brightness. This modified transition period may comprise a longer period of time (e.g., greater than one second) than the transition period to allow display 170 to change from the normal mode to the enhanced mode without the temperature associated with the increased brightness causing a delamination of the display as described above.

In one embodiment, thermal controller 120 may cause an operating mode of display 170 to change based on a modified transition period. Specifically, thermal controller 120 may cause the operating mode of display 170 to change from a normal mode to an enhanced mode according to the determined modified transition period described above. For example, thermal controller 120 may determine a modified transition period of greater than 5 seconds for a change from normal mode to HDR mode and may cause the operating mode of display 170 to change based on the modified transition period. In another example, thermal controller 120 may determine a modified transition period of greater than 5 seconds for a change from normal mode to HRR mode and may cause the operating mode of display 170 to change based on the modified transition period. In yet another example, thermal controller 120 may determine that display 170 may be exhibiting an abnormal mode indicating potential thermal issues (i.e., hot spots) around an edge of display 170 and may cause the operating mode of display 170 to change such that the potential thermal issues may be avoided. In particular, thermal controller 120 may determine a modified transition period in which the operating mode of display 170 changes from the abnormal mode to a normal mode to avoid overheating within display 170. Here, the modified transition period may cause a temperature of display 170 to slowly decrease (e.g., over the span of 5 seconds) until the temperature is less than 40° C., or any other suitable temperature threshold. In this way, thermal controller 120 may avoid sudden increases in brightness that cause rapid increases in temperature, thereby avoiding inadvertent damage (e.g., delamination) caused to display 170 over time.

Figure 2:
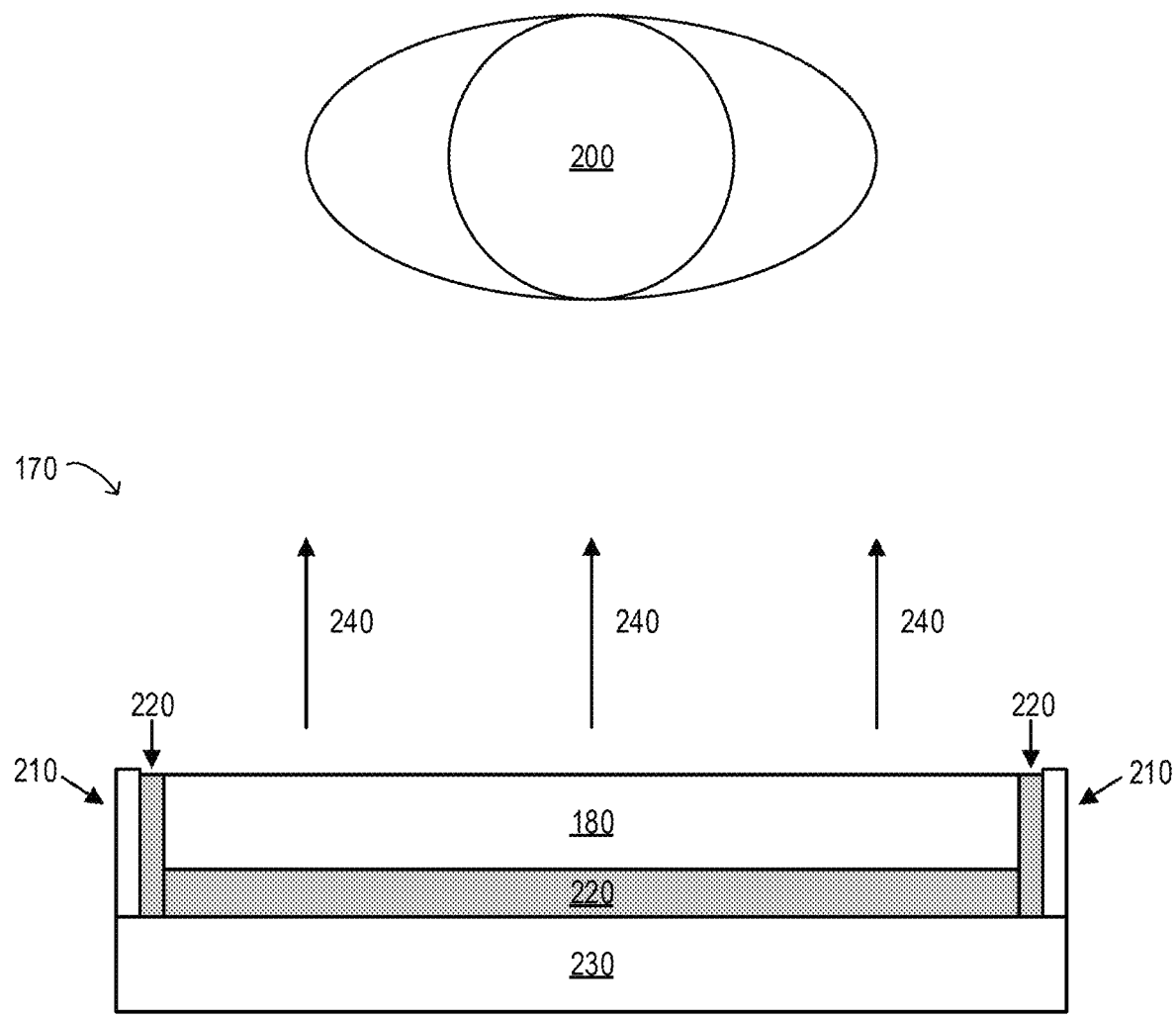
FIG. 2 is a block diagram of selected elements of an embodiment of a display that includes an absorption layer.

FIG. 2 is a block diagram of selected elements of an embodiment of a display that includes an absorption layer.

In the embodiment illustrated in FIG. 2, display 170 includes a light source 180 that emits a visible light 240 to display information to a user 200, a bezel 210, an absorption layer 220, and a display cover 230. In other embodiments, display 170 may include additional, fewer, and/or different components than the components shown in FIG. 2.

In one embodiment, bezel 210 may be a suitable system, apparatus, or device operable to house and conceal one or more internal components of display 170. In particular, bezel 210 may form an outside frame, or border, around an active viewing area (e.g., a screen) of display 170. Conventionally, bezels may exhibit a width (e.g., 2 inches or more) suitable to both maintain structural integrity of a display and conceal one or more internal components from view of a user. However, the advancement of technical trends has ushered an increasing demand for larger screen size on devices (e.g., display 170), thereby reducing bezel width in favor of increased active viewing area. As such, conventional displays may include narrow bezel, or bezel-less, designs that contribute to larger screen size without necessarily increasing screen dimensions. This decreasing bezel width may inadvertently allow a visible light (e.g., generated by light source 180) to escape, or create a "light leakage," from bezel 210 that may be distracting to a user (e.g., user 200).

In one embodiment, absorption layer 220 may be a suitable system, apparatus, or device operable to absorb light and heat within display 170. Specifically, absorption layer 220 may receive visible light emitted by light source 180 within display 170 and may absorb a portion of the visible light comprising a light leakage from display 170. Additionally, absorption layer 220 may absorb a portion of the heat associated with the visible light within display 170. Conventionally, a dark adhesive tape (e.g., duct tape, electrical tape, and the like) may be coupled to a backing of the light source to create a seal around a periphery of the light source in an effort to trap light within the display and to prevent light leakage. However, such adhesive tape may grow in thickness (e.g., greater than 200 micrometers) as multiple layers are applied to create the seal such that the multiple layers of adhesive tape may obstruct other components within display and/or prevent a display cover from properly coupling to the backing of the light source. Similarly, a conductive material (e.g., a copper sheet) may be coupled to a backing of the light source in an effort to dissipate heat generated by the light source within the display. However, such conductive material may also grow in thickness (e.g., greater than 200 micrometers) while affording minimal heat dissipation due to relatively poor conductivity (e.g., 398 W/m·K). In contrast, absorption layer 220 may be or include a composite of materials operable to absorb light and heat within display 170 while maintaining a minimal thickness (e.g., approximately 50 to 100 micrometers) and affording increased conductivity (e.g., approximately 600 to 700 W/m·K).

In one embodiment, absorption layer 220 may be or include a composite comprised of a polymer resin (e.g., an acrylic polymer) and granulated graphene. In this embodiment, the composite may consist of 50% polymer resin and 50% granulated graphene. In another embodiment, absorption layer 220 may additionally include a granulated conductor (e.g., copper flakes) used to further absorb heat within display 170. Here, graphene and/or copper may be in the form of a fine powder that may be mixed into the polymer resin to make a uniform solution. This uniform solution may then be applied across a surface of display cover 230 as shown in FIG. 2. Specifically, the inner surface of display cover 230 and/or the backing of light source 180 may be micro-etched such that absorption layer 220 may be applied to the inner surface of display cover 230 and/or the backing of light source 180, thereby coupling the display cover 230 to the light source 180.

In one embodiment, absorption layer 220 may be applied (e.g., using an ultrasonic jet, sputtering technique, and the like), or otherwise coupled, to a surface of display cover 230 such that absorption layer 220 may have a variable thickness across display cover 230. That is, absorption layer 220 may be applied with a gradient thickness such that absorption layer 220 may exhibit varying thermal conductivity based on the thickness of absorption layer 220 at a given location on the surface of display cover 230. For example, the areas shown in FIG. 2 in which display cover 230 is orthogonally coupled to bezel 210 may generate a higher temperature and create a greater degree of light leakage than an area in the center of display cover 230. In this example, the areas in which display cover 230 is orthogonally coupled to bezel 210 may receive a thicker application of absorption layer 220 (i.e., 20-30% more thickness) to increase the thermal conductivity and decrease the degree of light leakage in those areas. Conversely, the area in the center of display cover 230 may receive a thinner application of absorption layer 220 given that this area does not generate as high a temperature or create as great a degree of light leakage as the areas of display cover 230 orthogonally coupled to bezel 210. In this way, absorption layer 220 may be applied to a surface of display cover 230 with a gradient thickness such that heat is dissipated evenly, thereby avoiding buildup of excess heat and light leakage in areas of display 170 where buildup may typically occur.

Upon absorbing a portion of heat from the visible light within display 170, absorption layer 220 may transfer the portion of heat into display cover 230. In one embodiment, display cover 230 may be comprised of a metal material (e.g., aluminum) such that the portion of heat absorbed by absorption layer 220 may be readily transferred to display cover 230. Here, a composition of the polymer resin and granulated graphene comprising absorption layer 220 may include a smaller percentage (e.g., 40%) of granulated graphene than polymer resin given that the portion of heat absorbed by absorption layer 220 may be readily transferred to display cover 230. In another embodiment, display cover 230 may be comprised of a rigid, and/or semirigid, material (e.g., plastic) such that the portion of heat absorbed by absorption layer 220 may be slowly transferred to display cover 230. Here, a composition of the polymer resin and granulated graphene comprising absorption layer 220 may include a larger percentage (e.g., 60%) of granulated graphene than polymer resin given that the portion of heat absorbed by absorption layer 220 may be slowly transferred to display cover 230. That is, the composition of absorption layer 220 may vary based on the type of material comprising display cover 230. In this way, the composition of absorption layer 220 may be modified to optimize thermal dissipation in display 170 without being restricted to any particular material used for display cover 230. Once the portion of heat absorbed from the visible light received by absorption layer 220 has been transferred into display cover 230, display cover 230 may transfer the portion of heat away from information handling system 100, thereby effectively managing thermal dissipation in display 170.

Figure 3:
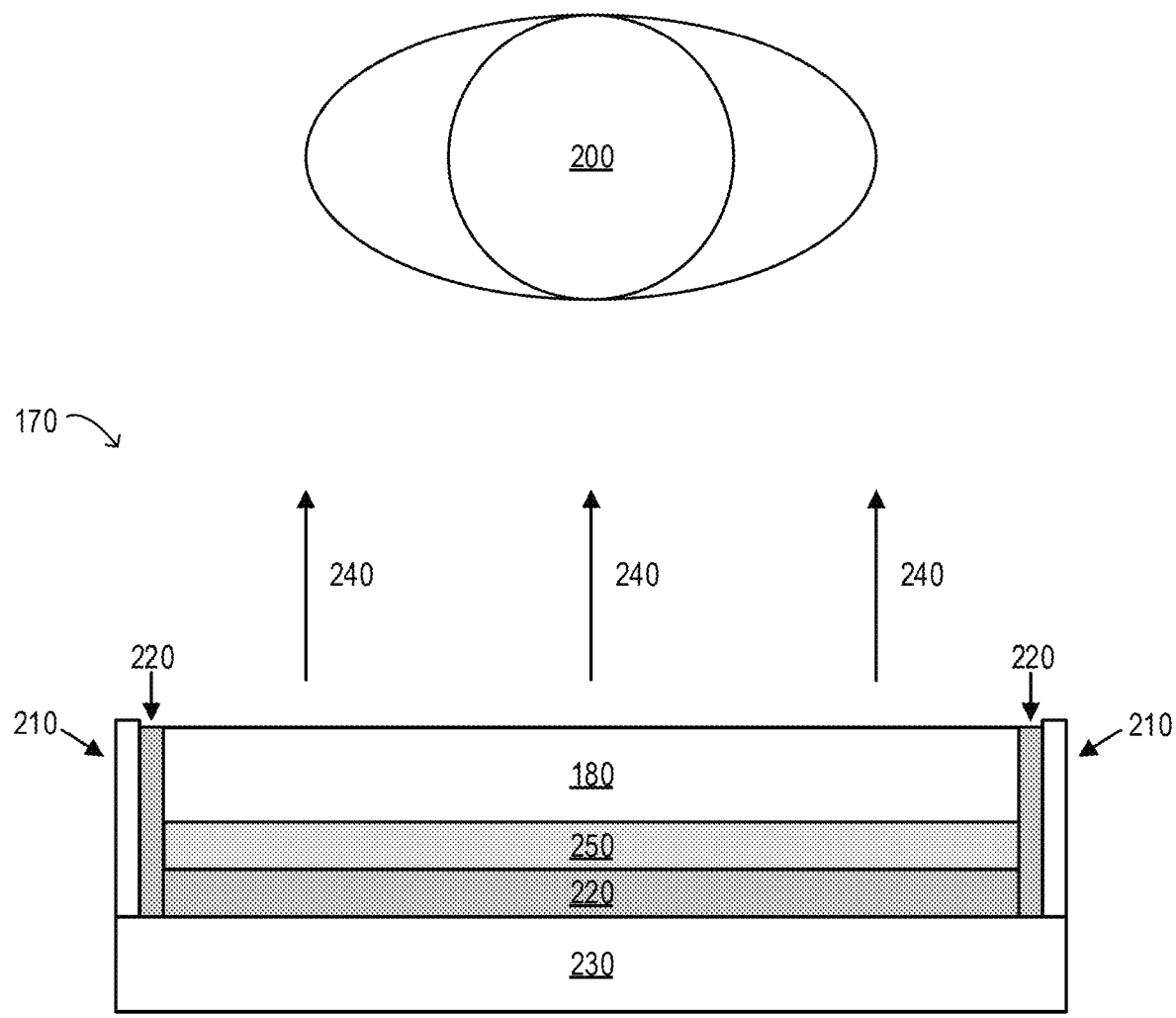
FIG. 3 is a block diagram of selected elements of an embodiment of a display that includes an absorption layer and a reflective layer.

FIG. 3 is a block diagram of selected elements of an embodiment of a display that includes an absorption layer and a reflective layer. In the embodiment illustrated in FIG. 3, display 170 includes a light source 180 that emits a visible light 240 to display information for a user 200, a bezel 210, an absorption layer 220, and a display cover 230 as described above with respect to FIG. 2. However, FIG. 3 further includes a reflective layer 250 disposed between light source 180 and absorption layer 220. In other embodiments, display 170 may include additional, fewer, and/or different components than the components shown in FIG. 3.

In one embodiment, reflective layer 250 may be a suitable system, apparatus, or device operable to reflect visible light within display 170. In particular, reflective layer 250 may receive visible light emitted by light source 180 within display 170 and may reflect, or otherwise recycle, a portion of the visible light within display 170. That is, reflective layer 250 may be or include a composite of materials operable to reflect light within display 170 while maintaining a minimal thickness (e.g., approximately 50 to 100 micrometers). In one embodiment, reflective layer 250 may be or include a composite comprised of polymer resin and granulated aluminum. Here, the granulated aluminum comprising reflective layer 250 may receive visible light emitted by light source 180 and may reflect a portion of the visible light before the visible light is received by absorption layer 220. In another embodiment, reflective layer 250 may be or include a composite comprised of polymer resin and granulated silver. In other embodiments, reflective layer 250 may be or include a composite comprised of mylar, acrylic mirror, metallic gold, and/or any other reflective material suitable for reflecting visible light within display 170.

FIG. 4 is a flowchart depicting selected elements of an embodiment of a method for managing thermal dissipation in a display of an information handling system. It is noted that certain operations described in method 400 may be optional or may be rearranged in different embodiments.

Method 400 may begin at step 410, where a light source of the display may emit a visible light within the display. The visible light may be associated with a heat within the display. For example, a given operating mode of display 170 may cause light source 180 to emit visible light at a respective brightness, thereby causing light source 180 to generate a respective level of heat within display 170 as described above with respect to FIG. 1. In steps 420 and 430, an absorption layer of the display may receive the visible light within the display and may absorb a portion of the visible light comprising a light leakage from the display. The absorption layer may be coupled to a display cover of the display. For example, absorption layer 220 may receive visible light emitted by light source 180 within display 170 and may absorb a portion of the visible light comprising a light leakage from display 170 as described above with respect to FIG. 2. Absorption layer 220 may be applied (e.g., using an ultrasonic jet, sputtering technique, and the like), or otherwise coupled, to a surface of display cover 230 such that absorption layer 220 may have a variable thickness across display cover 230 as described above with respect to FIG. 2. In step 440, the absorption layer may absorb a portion of the heat within the display. For example, absorption layer 220 may be or include a composite of materials operable to absorb light and heat within display 170 while maintaining a minimal thickness (e.g., approximately 50 to 100 micrometers) and affording increased conductivity (e.g., approximately 600 to 700 W/m·K) as described above with respect to FIG. 2. In step 450, the absorption layer may transfer the portion of heat into the display cover. For example, absorption layer 220 may transfer the portion of heat absorbed from the visible light within display 170 into display cover 230 as described above with respect to FIG. 2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method for managing thermal dissipation in a display of an information handling system, the method comprising:
   emitting, by a light source of the display, a visible light within the display, the visible light associated with a heat within the display;
   receiving, by an absorption layer of the display, the visible light within the display, the absorption layer coupled to a display cover of the display;
   absorbing, by the absorption layer, a portion of the visible light comprising a light leakage from the display;
   absorbing, by the absorption layer, a portion of the heat within the display;
   transferring, by the absorption layer, the portion of the heat into the display cover;
   identifying, by a thermal controller of the information handling system, that an operating mode of the display has been modified from a normal mode to an enhanced mode, the enhanced mode causing the light source to emit the visible light with an increased brightness;
   identifying, by the thermal controller, a transition period associated with the enhanced mode, the transition period comprising a period of time in which the operating mode changes from the normal mode to the enhanced mode;
   determining, by the thermal controller, a modified transition period associated with the enhanced mode based on the transition period and a temperature associated with the increased brightness; and
   causing, by the thermal controller, the operating mode to change from the normal mode to the enhanced mode based on the modified transition period.

2. The method of claim 1, further comprising:
   transferring, by the display cover, the portion of the heat away from the information handling system.

3. The method of claim 1, further comprising:
   receiving, by a reflective layer of the display, the visible light within the display, the reflective layer coupled to the absorption layer; and
   reflecting, by the reflective layer, the visible light within the display.

4. The method of claim 3, wherein the reflective layer is a composite comprised of an acrylic polymer and a granulated silver.

5. The method of claim 1, wherein the modified transition period comprises a longer period of time than the transition period, the longer period of time allowing the operating mode of the display to change from the normal mode to the enhanced mode without the temperature associated with the increased brightness causing a delamination of the display.

6. The method of claim 1, wherein the enhanced mode comprises:
   a high dynamic range (HDR) mode; and
   a high refresh rate (HRR) mode.

7. The method of claim 1, wherein the absorption layer is a composite comprised of an acrylic polymer and a granulated graphene.

8. The method of claim 1, wherein the light source of the display is comprised of a plurality of organic light-emitting diodes (OLEDs).

9. An information handling system, comprising:
   at least one processor; and
   a display including:
      a display cover;
      a light source configured to emit a visible light within the display, the visible light associated with a heat within the display; and
      an absorption layer coupled to the display cover, the absorption layer configured to:
         receive the visible light within the display;
         absorb a portion of the visible light comprising a light leakage from the display;
         absorb a portion of the heat within the display; and
         transfer the portion of the heat into the display cover; and
      a thermal controller configured to:
         identify that an operating mode of the display has been modified from a normal mode to an enhanced mode, the enhanced mode causing the light source to emit the visible light with an increased brightness;
         identify a transition period associated with the enhanced mode, the transition period comprising a period of time in which the operating mode changes from the normal mode to the enhanced mode;
         determine a modified transition period associated with the enhanced mode based on the transition period and a temperature associated with the increased brightness; and
         cause the operating mode to change from the normal mode to the enhanced mode based on the modified transition period.

10. The information handling system of claim 9, wherein the display cover is configured to transfer the portion of the heat away from the information handling system.

11. The information handling system of claim 9, wherein the display further includes:

a reflective layer coupled to the absorption layer, the reflective layer configured to:
receive the visible light within the display; and
reflect the visible light within the display.

12. The information handling system of claim 11, wherein the reflective layer is a composite comprised of an acrylic polymer and a granulated silver.

13. The information handling system of claim 9, wherein the modified transition period comprises a longer period of time than the transition period, the longer period of time allowing the operating mode of the display to change from the normal mode to the enhanced mode without the temperature associated with the increased brightness causing a delamination of the display.

14. The information handling system of claim 9, wherein the enhanced mode comprises:
a high dynamic range (HDR) mode; and
a high refresh rate (HRR) mode.

15. The information handling system of claim 9, wherein the absorption layer is a composite comprised of an acrylic polymer and a granulated graphene.

16. A system for managing thermal dissipation in a display of an information handling system, the system comprising:
a display comprising:
a display cover;
a light source configured to emit a visible light within the display, the visible light associated with a heat within the display; and
an absorption layer coupled to the display cover, the absorption layer configured to:
receive the visible light within the display;
absorb a portion of the visible light comprising a light leakage from the display;
absorb a portion of the heat within the display; and
transfer the portion of the heat into the display cover; and
a thermal controller configured to:
identify that an operating mode of the display has been modified from a normal mode to an enhanced mode, the enhanced mode causing the light source to emit the visible light with an increased brightness;
identify a transition period associated with the enhanced mode, the transition period comprising a period of time in which the operating mode changes from the normal mode to the enhanced mode;
determine a modified transition period associated with the enhanced mode based on the transition period and a temperature associated with the increased brightness; and
cause the operating mode to change from the normal mode to the enhanced mode based on the modified transition period.

17. The system of claim 16, wherein the display cover is configured to transfer the portion of the heat away from the information handling system.

18. The system of claim 16, wherein the display further includes:
a reflective layer coupled to the absorption layer, the reflective layer configured to:
receive the visible light within the display; and
reflect the visible light within the display.

* * * * *